US009495835B2

(12) United States Patent
Constable et al.

(10) Patent No.: US 9,495,835 B2
(45) Date of Patent: Nov. 15, 2016

(54) VIRAL PROGRESSIVE JACKPOT

(75) Inventors: John Frederic Constable, San Francisco, CA (US); Jon-Paul Emile Dumont, San Francisco, CA (US); Michael J. Engle, Daly City, CA (US); Cor Robert Despota, San Francisco, CA (US); James Chia-Ming Liu, Foster City, CA (US); Michael Anthony Fox, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 175 days.

(21) Appl. No.: 13/483,971

(22) Filed: May 30, 2012

(65) Prior Publication Data

US 2013/0324233 A1 Dec. 5, 2013

(51) Int. Cl.
*A63F 13/00* (2014.01)
*G07F 17/32* (2006.01)

(52) U.S. Cl.
CPC ....... *G07F 17/3258* (2013.01); *G07F 17/3272* (2013.01); *G07F 17/3293* (2013.01)

(58) Field of Classification Search
USPC ................................................ 463/25–28, 42
See application file for complete search history.

(56) References Cited

U.S. PATENT DOCUMENTS

| | | | |
|---|---|---|---|
| 5,280,909 A * | 1/1994 | Tracy | 463/27 |
| 5,344,144 A * | 9/1994 | Canon | 463/27 |
| 2002/0016202 A1* | 2/2002 | Fertitta et al. | 463/25 |
| 2005/0143169 A1* | 6/2005 | Nguyen et al. | 463/25 |
| 2006/0073888 A1* | 4/2006 | Nguyen et al. | 463/27 |
| 2010/0062840 A1* | 3/2010 | Herrmann | 463/25 |
| 2010/0203942 A1* | 8/2010 | Walker et al. | 463/17 |
| 2010/0216541 A1* | 8/2010 | Boyd et al. | 463/20 |
| 2011/0218034 A1* | 9/2011 | Barclay et al. | 463/25 |

* cited by examiner

*Primary Examiner* — Jason Yen
(74) *Attorney, Agent, or Firm* — Martine Penilla Group, LLP

(57) ABSTRACT

Methods, systems, and computer programs are presented for executing a computer game. One method includes an operation for setting an initial value to the jackpot of a first player. The jackpot of the first player is increased based on each bet by the first player in the computer game. Additionally, the jackpot of the first player is increased based on each bet made by friends of the first player in the computer game. The friends of the first player have a social connection with the first player, and the jackpot of the first player is independent from bets in the computer game of players that are not friends of the first player. The method further includes an operation for resetting the jackpot of the first player to the initial value when the first player or when any friend of the first player wins the jackpot.

19 Claims, 10 Drawing Sheets

Jackpot Update
Player -> Server transaction ID: 11235879ABF25
player ID: 12A7BGH
timestamp: 2012051520361524
machine: Sea Whirld
bet: 120
contribution: 12
jackpot value: 2987

Fig. 5B

Jackpot Update
Server -> Player transaction ID: FF45689879ABF25
player ID: 12A7BGH
timestamp: 2012051520135024
machine: Sea Whirld
bet[s]: 600
contribution: 60
jackpot value: 3430
message: “3 of your friends added $60 to the jackpot”

Fig. 5C

VIRAL PROGRESSIVE JACKPOT

BACKGROUND

1. Field of the Invention

The present embodiments relate to methods for executing games in a distributed environment, and more particularly, methods, systems, and computer programs for providing viral rewards in a computer game.

2. Description of the Related Art

The popularity of casino games has extended to casino games played online. Online games such as poker, slots, blackjack, etc., are played by a large number of users on a computer. However, the enjoyment of these online games may be reduced due to the solitary nature of some of these games, such as slots, where a player bets against a machine, and more particularly, against the odds of winning offered by the machine. In a slots game, the player enters a bet and spins the wheel hoping to get a winning combination that would provide a reward. However, there is no typical social interaction with other players in the game.

Social interaction in online games is appealing to many users that wish to share some of their gaming experience with other friends, or other potential friends that may be made online. But existing slots online games do not currently provide many opportunities for social interaction with other players, nor they provide gaming interactions with other players, as the game of a slots player does not relate to the game of another slots players.

It is in this context that embodiments arise.

SUMMARY

Methods, systems, and computer programs are presented for executing a computer game. It should be appreciated that the present embodiments can be implemented in numerous ways, such as a method, an apparatus, a system, a device, or a computer program on a computer readable medium. Several embodiments are described below.

In one embodiment, a method includes an operation for setting an initial value to the jackpot of a first player. The jackpot of the first player is increased based on each bet by the first player in the computer game. Additionally, the jackpot of the first player is increased based on each bet made by friends of the first player in the computer game. The friends of the first player have a social connection with the first player, and the jackpot of the first player is independent from bets in the computer game by players that are not friends of the first player. The method further includes an operation for resetting the jackpot of the first player to the initial value when the first player or any friend of the first player wins the jackpot.

In another embodiment, a system for executing a computer game includes a memory and a jackpot manager. The memory is operable to store a jackpot state for each player of the computer game. The jackpot manager includes a processor and is operable to receive jackpot updates from players. For each jackpot update from a first player, the jackpot manager updates the jackpot states of the first player and of friends of the first player in the computer game. When the first player wins the jackpot, the jackpot manager resets the jackpot states of the first player and of the friends of the first player, while leaving unchanged the jackpot states of players that are not friends of the first player in the computer game.

In yet another embodiment, a computer program embedded in a non-transitory computer-readable storage medium, when executed by one or more processors, for executing a computer game, includes program instructions for setting an initial value to a jackpot of a first player, and program instructions for increasing the jackpot of the first player based on each bet by the first player in the computer game. Additionally, the computer program further includes program instructions for increasing the jackpot of the first player based on each bet made by friends of the first player in the computer game, where the friends of the first player have a social connection with the first player, and program instructions for resetting the jackpot to the initial value when the first player or any friend of the first player wins the jackpot. The jackpot of the first player is left unchanged when players that are not friends of the first player in the computer game win the jackpot.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 5B-5C illustrate data structures for providing jackpot updates, according to some embodiments.

DETAILED DESCRIPTION

The following embodiments describe methods, systems, and computer programs for executing a computer game. It will be apparent, that the present embodiments may be practiced without some or all of these specific details. In other instances, well known process operations have not been described in detail in order not to unnecessarily obscure the present embodiments.

Figure 1:
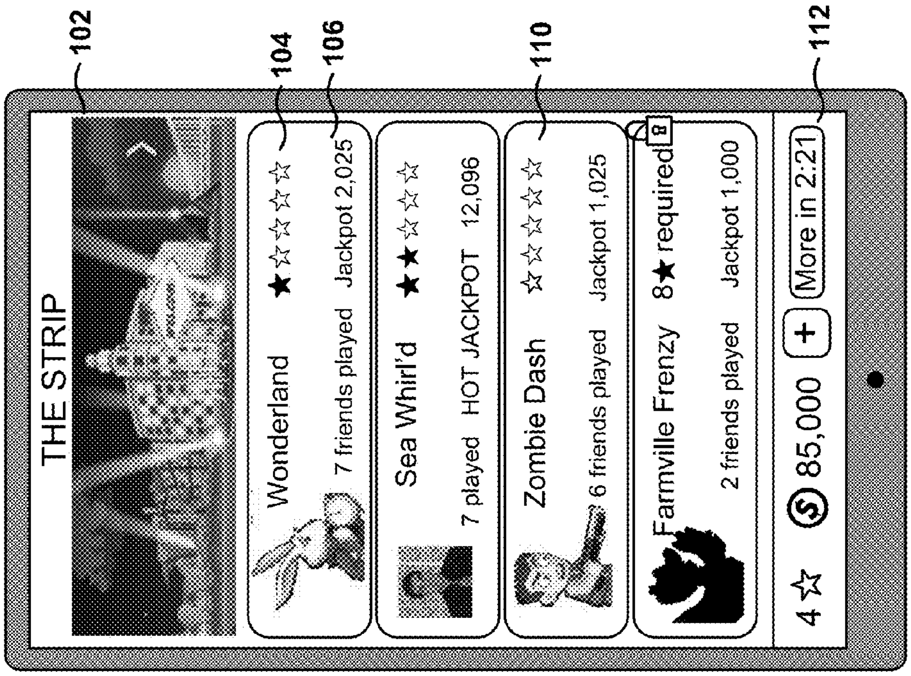
FIG. 1 is a Graphical User Interface (GUI) for the lobby in a casino game, according to one embodiment.

FIG. 1 is a Graphical User Interface (GUI) for the lobby in a casino game, according to one embodiment. Some casinos have slots jackpots that grow over time, which are sometimes referred to as progressive jackpots because the more players gamble, the larger the jackpot grows. The formula to calculate the jackpot, or the odds for winning are typically a mystery. The probability of winning appears to be very small, and a large jackpot is only a small incentive to play, because most players believe that winning the jackpot is virtually impossible. Additionally, the jackpot in a casino is based on how much money is bet by all the players in the casino.

Embodiments provide a jackpot that has a viral component, which means that the size of the jackpot is related to social activity in the game. In one embodiment, the jackpot for each player is calculated independently, instead of having one big jackpot that is common to all the players in the casino. In addition, the size of the jackpot for each player is based on the amount bet by the player and based on the amount bet by friends of the player. In one embodiment, the jackpot of a particular player is not affected by bets performed by players that are not friends of the particular player.

It is noted that the embodiments described herein are described with reference to the slots online game, but the principles may be utilized in other online games, as well as in real-life games. The embodiments described herein should therefore not be interpreted to be exclusive or limiting, but rather exemplary or illustrative.

As used herein, a “friend” of a player refers to a person that has established a social link with the player in the game. For example, a first player has invited a second player to be “buddies” or “friends” in the game, and the second player has accepted, which makes them “friends” in the game. In other embodiments, the friendship in the game is established via a social network, such that friends of the player in the social network become friends of the player in the online game. It is noted that although two persons may be friends in real life, if the two persons have not established a friendship relationship online, they will not be considered friends in the online game. Of course, if two persons do not know each other in real life, and they do not have an online friendship relationship, the two persons will not be friends in the game. This means that, in one embodiment, the jackpots of the two persons that do not have an online friendship relationship will be independent from each other.

By linking the size of the jackpot with the play of friends, the viral component of the slots online game becomes very relevant, because the more a player plays and the more friends play, the bigger the jackpot will be. Also, the more friends that play the game, the bigger the jackpot, which encourages players to invite friends to play in the online social game to build bigger jackpots.

In one embodiment, the jackpot is referred to as a viral progressive jackpot. The jackpot is progressive because the more that players play, the bigger the jackpot will be, and the jackpot is viral because the more friends play, the bigger the jackpot will be.

FIG. 1 shows the interface of a slots game played on a portable device 102. The GUI represents a lobby where the player may select from one or more machines to play. Some of the machines, such as “Zombie Dash” 110 are locked and unavailable to the player because the player does not meet the requirements for playing that machine (e.g., the player has not earned enough stars to play Zombie Dash). Other machines like Wonderland 104 and Sea Whirl’d are open and unlocked to play the slots game. In one embodiment, the machines are referred to as theme machines because the machines are built around a theme, which includes one or more of background images, art, style, payout rates, symbols utilized in the wheels of the slots, etc. In one embodiment, as the player advances in the game, the player is given access to new theme machines that provide better chances of winning, and ability to win items that are not available in the lower level machines.

In one embodiment, message 106 shows how many friends are playing at the particular machine or what the size of the player’s jackpot is. At the bottom of the GUI, and informational area 112 indicates, among other things, how much game currency the player has (e.g., 85,000) and how many stars the player has, where the stars indicate how much progress has been made in the game, gaining stars as the player spends more time playing the slots game.

Figure 2A:
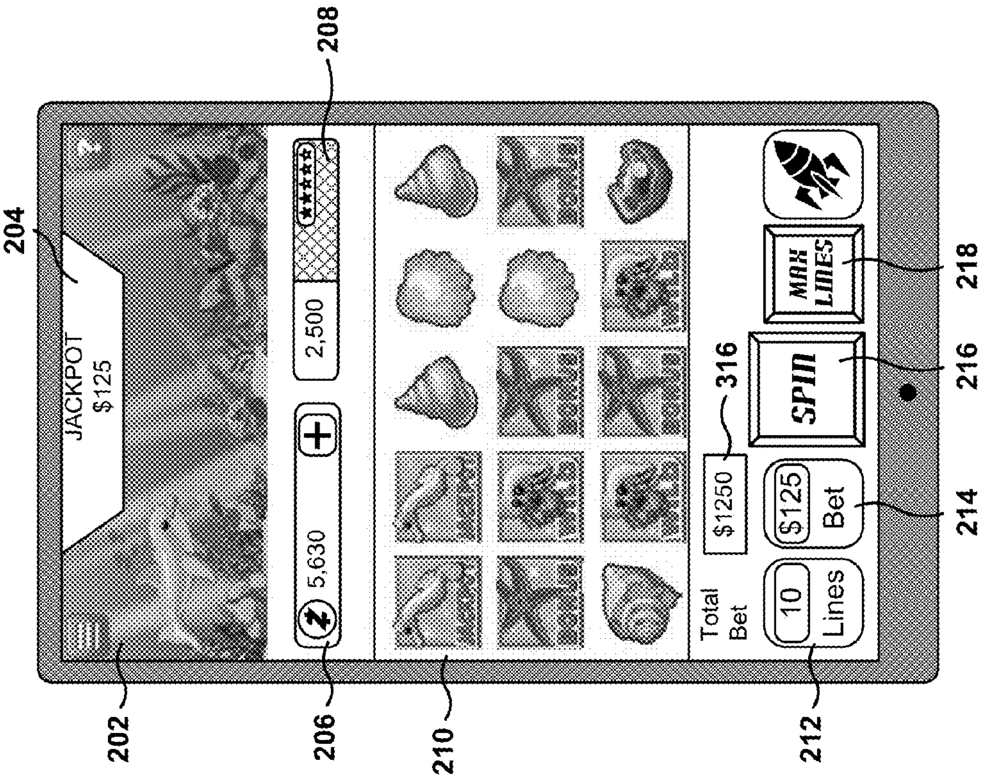
FIGS. 2A-2C illustrate interfaces for playing a game in a mobile device, according to one embodiment.
Figure 2C:
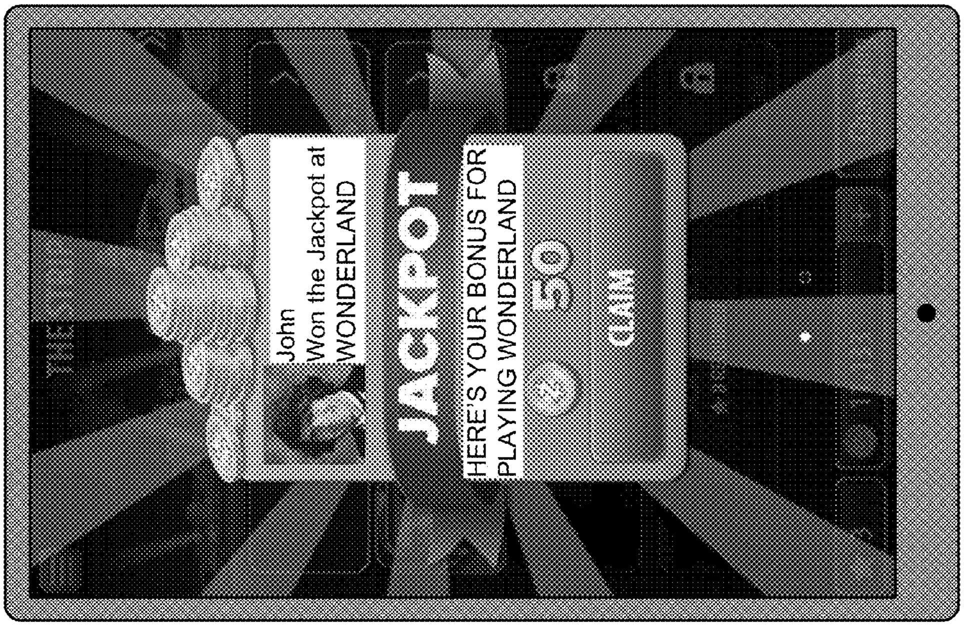
Figure 2B:
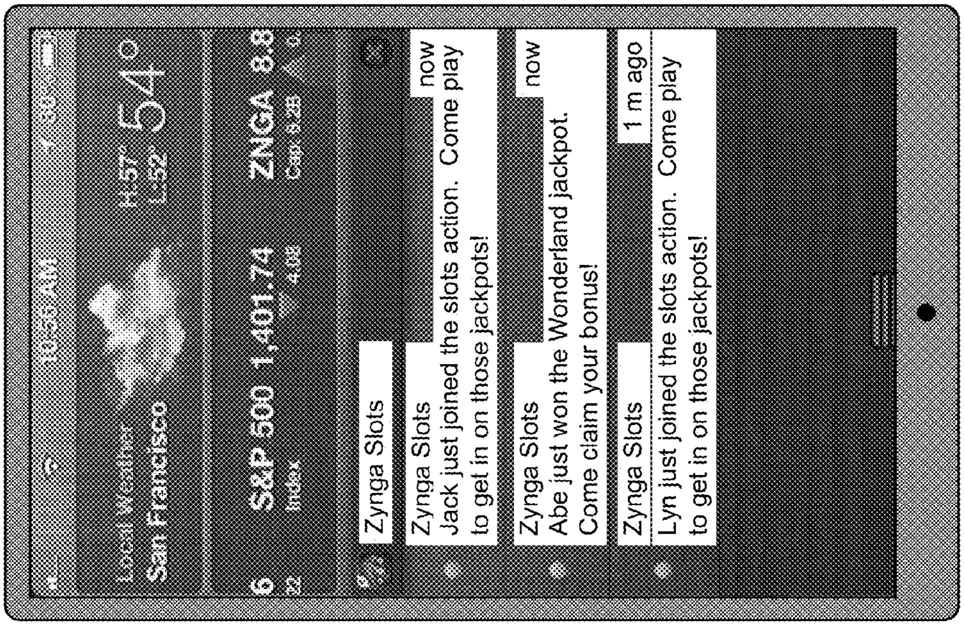

FIG. 2A-2C illustrate interfaces for playing a game in a mobile device, according to one embodiment. Once the player selects a theme machine, the player is presented a GUI 202 to play slots, such as the one shown in FIG. 2A. On the top, the jackpot amount 204 is displayed. The total amount of currency to bet in the game is presented in field 206, and a progress bar 208 shows the progress made by the player in the current machine. The progress bar 208 also includes a number of stars earned in the theme machine.

The wheels 210 spin when the player presses the spin button 216. The player is able to enter the amount of lines 212 being bet on every time the wheels spin. Each of the lines includes a different combination of symbols from the wheels.

For example, one line may include the five symbols across the center line, while other lines may form different combinations of symbols, such as the top symbol on the first three wheels, followed by the center symbol in the fourth wheel, and followed by the bottom symbol in the fifth wheel.

In one embodiment, the player must get a specific combination of the wheels to win the jackpot. For example, the player must get five “jackpot” symbols across the center line. This means that the jackpot is a random event-based on the probability of obtaining the “jackpot” symbol in each of the wheels. Therefore, in one embodiment, the jackpot is based on luck and not based on other factors, such as when the jackpot reaches a certain value.

In another embodiment, the jackpot size may be also based on other factors besides the probability of the wheels, and the probability to win the jackpot may change when the jackpot reaches a certain size, or a certain age (e.g., elapsed since the jackpot was initialized), etc.

In yet another embodiment, the odds of winning the jackpot are adjusted in the computer program by aiming to obtain a winner on average for a player that plays once a week and has three sessions per day, but other odds adjusting parameters may also be utilized.

In bet field 214 the player enters the amount being bet for each line, and the total bet field 316 indicates the total amount bet in the current spin. The total bet amount is equal to the number of lines 212 times the bet per line 125. A maximum lines button 218 provides a shortcut to the player for betting the maximum number of lines.

In one embodiment, as the player spins the wheels, the jackpot continuously grows based on the amount bet by the player. In one embodiment, the jackpot growth, also referred to as the jackpot contribution by the player, is a fixed percentage of the amount bet, although the percentage amount may vary from machine to machine. For example, as the player progresses in the game the player may gain access to machines that provide biggest rewards, including a faster jackpot growth. In one embodiment, the jackpot contribution is 10 percent of the bet, and in other embodiment the jackpot contribution is in the range of 2 to 15 percent, although other values are also possible.

In another embodiment, different formulas for jackpot growth may be utilized. For example, the jackpot growth may be at a fixed percentage until the jackpot reaches a predetermined amount, and then changed to a different percentage growth afterwards, providing different accelerations for the jackpot growth at different times. In another embodiment, the jackpot grows based on a geometric function, for example growing at an exponential growth, which means that the jackpot grows faster as the jackpot gets bigger, or inverse exponential growth where the jackpot grows slower as the jackpot gets bigger.

After playing the game for a while, the player has made a certain contribution to the jackpot (e.g., 100 dollars), and the same contribution is added to the jackpots of friends of the player (which means that the jackpot of the friends have also gone up 100 dollars). Accordingly, the more friends a player has playing the game, the faster the jackpot will grow for the player. This way, jackpot growth is based on the viral contribution from friends of the player. The reciprocal is also true, when a player contributes to her own jackpot, the jackpot of the player's friends grow at the same time.

In one embodiment, the contribution $C_p$ made by player p to the jackpot is calculated according to the following formula:

$$C_p = B_p * \text{rate} \quad (1)$$

Where $B_p$ is the amount of money bet by player p since the jackpot was initialized (e.g., the time when player p or a friend of player p won the jackpot), and rate is a percentage value for determining contribution $C_p$. Of course, if a new player $p_2$ establishes a new friendship relationship in the game, the jackpot $J_{p2}$ for $p_2$ will include the contributions from the friends of $p_2$ made after the friendship relationship was established, not including the contributions from the friends of $p_2$ made before becoming friends in the game.

In one embodiment, the jackpot $J_p$ of player p is calculated according to the following formula:

$$J_p = C_p + \Sigma_{i=friend\ of\ p} C_i \quad (2)$$

The jackpot $J_p$ of player p is calculated by adding the contribution $C_p$ made by player p and the contributions $C_i$ made by all the friends i of player p.

FIG. 2B illustrates push notifications (e.g., messages) received by the player of the online game. If the player allows, in the configuration of the game or of the mobile device, the receipt of game messages, the game will send messages according to the configuration, such as when friends of the player are playing online, when the jackpot has reached a certain value, when a bonus has been gained, when a friend has won a jackpot or when a friend has won a big jackpot, news from the game, the release of a new theme machine, a special discount sale on game currency, etc.

FIG. 2C illustrates the message shown to the player when a friend wins the jackpot (e.g., "John won the jackpot at WONDERLAND"). In one embodiment, friends of the player that wins the jackpot also get a reward. In one embodiment, each friend gets a fixed reward amount (e.g., 50 dollars, although other amounts are also possible). In another embodiment, the friends get a small percentage of the jackpot, such as one percent, although other percentage values are also possible.

Figure 3:
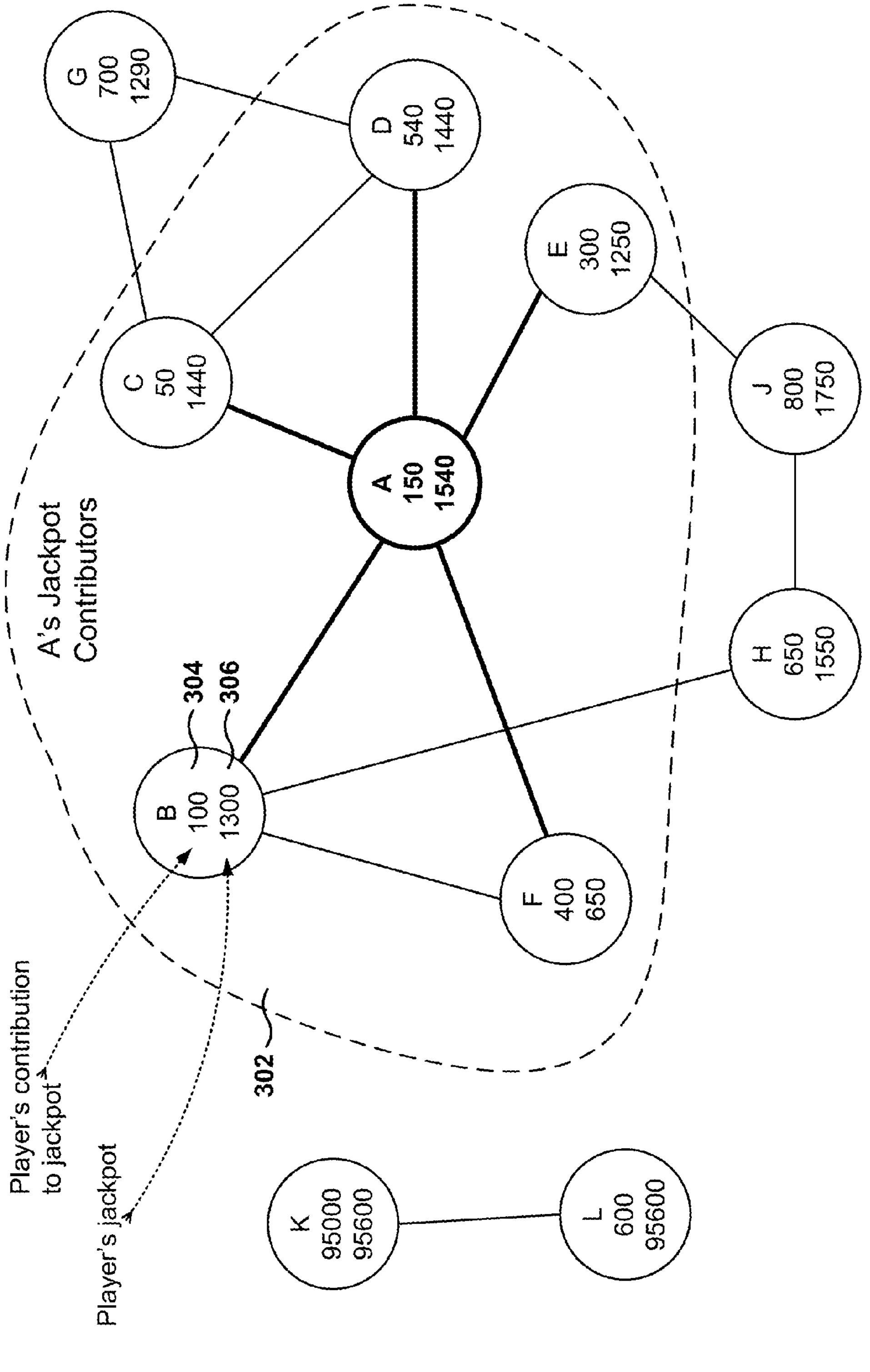
FIG. 3 illustrates how the jackpot is calculated based on social relationships, according to one embodiment.

FIG. 3 illustrates how the jackpot is calculated based on social relationships, according to one embodiment. As described above, the jackpot is calculated based on contributions made by a player and the player's friends. In the exemplary embodiment of FIG. 3, in order to calculate the jackpot $J_a$ for player A, the contributions of player A and A's friend are added. A's friends are inside area 302, which includes players B, C, D, E, and F. Two amounts are associated with each player in FIG. 3, the player's contribution to the jackpot 304 and the size of the player's jackpot 306. Therefore, the jackpot $J_a$ of player A is calculated using equation (2) as follows:

$$J_a = C_a + C_b + C_d + C_e + C_f + C_g$$

$$J_a = 150 + 100 + 50 + 540 + 300 + 400 = 1540$$

The jackpot for each player is calculated independently of the jackpot calculations for other players. Therefore, the jackpot for each player is independent from each other and not necessarily equal. In fact, most times the jackpot of the players will be different, unless two players have the same friends in the game, which will mean that both players will have the same jackpot. Of course, there may be other jackpot contribution factors such as level of expertise, a jackpot increase bonus won by a player, etc., which may make the jackpots different.

In one embodiment, if two players playing the game only have each other as friends, their jackpots will be identical, independent of how much each of the players bet on the game. For example, players K and L only have each other as friends. While player K has contributed 95,000 to the jackpot and player L has only contributed 600 to the jackpot, both players have the same jackpot with a value of 95,600. It does not matter that player K has played much more than player L, their jackpots are the same. Of course, since player K seems to play much more than player L, player K will likely have a bigger probability of winning the jackpot, just because player K plays more often.

When a player wins, the jackpot of the player gets reset to an initial value (e.g., 100, although other values are also possible), which may be different in the different theme machines. In addition, when a player wins, the jackpots of the friends players are also reset to the initial value. Because of this, a player wants to win the jackpot before any of the player's friends do, because if any friend wins then the player's jackpot gets reset. For example, a player that may have played a lot (e.g., the player has "heated the machine") does not want all her efforts to go to waste by having a friend "steal" the jackpot away from her. On the other hand, an opportunistic player that has not played a lot may realize that a large jackpot is available and decide to start playing more in order to increase the chances of winning the jackpot. Of course, "parasitic" players may not have long social relationships in the game as players may not like having their jackpot "stolen" away from players that do not contribute their share to the jackpot. Having many friends means that a player's jackpot will grow fast, but it also means that there are more players competing to win the jackpot.

In the scenario where a new player starts playing the game, once the player establishes friendship relationships in the game, the player will start competing for the jackpot. If the friends of the new player have been playing for a while, the friends may have built build a large jackpot, but since the new player has recently joined, the new player will have a smaller jackpot. However, if the new player wins, all the jackpots are reset, which means that the new player will win a relatively small jackpot, but the player's friends will lose the large jackpot that they had built.

Figure 4:
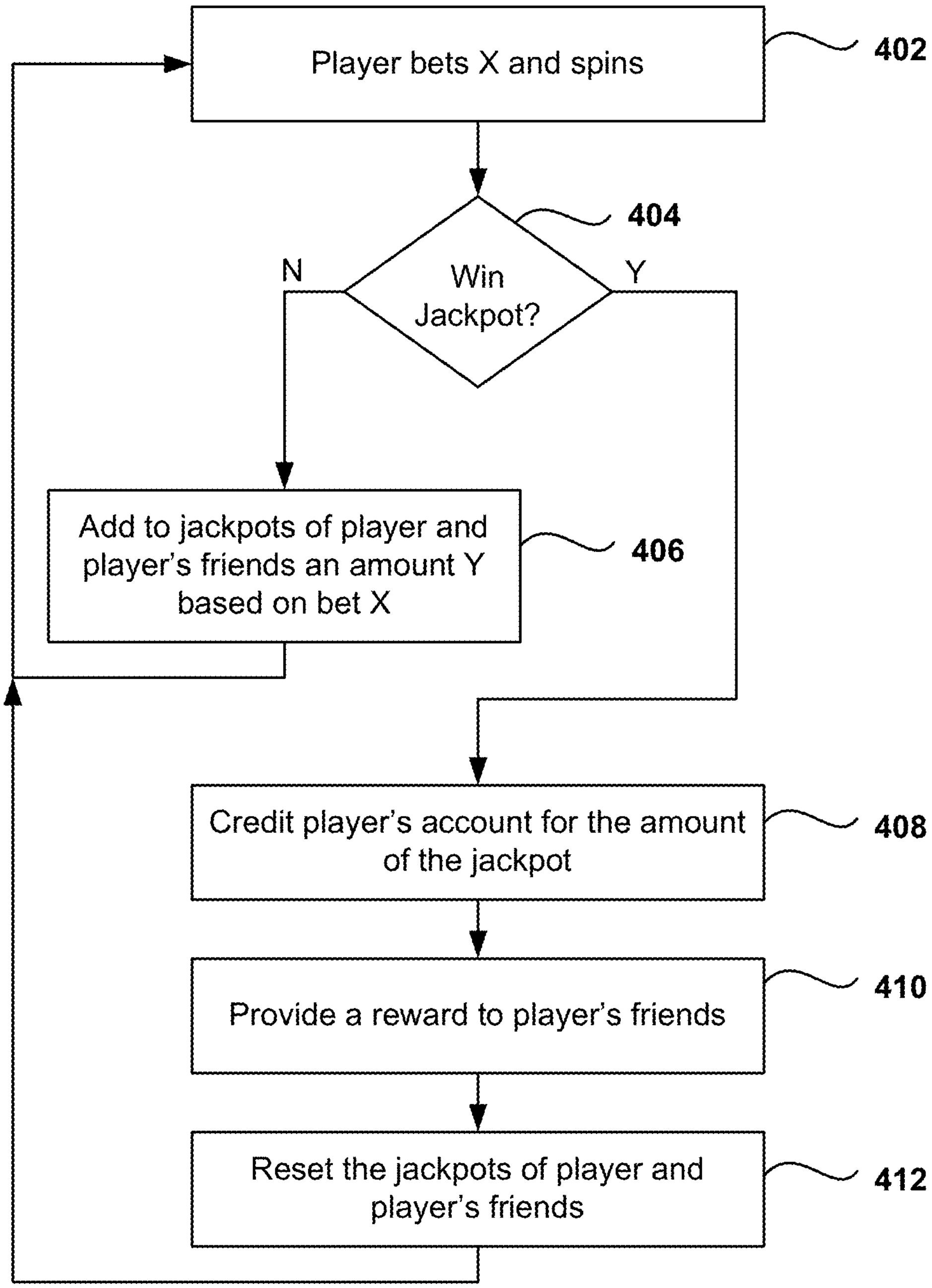
FIG. 4 shows a flowchart illustrating an algorithm for determining the jackpot in the computer game, in accordance with one embodiment.

FIG. 4 shows a flowchart illustrating an algorithm for determining the jackpot in the computer game, in accordance with one embodiment. In one embodiment, when a player wins the jackpot, three things happened:

1. The player gets the jackpot;

2. The friends of the player receive a consolation prize; and

3. The jackpot of the player and the jackpots of the player's friends are reset to an initial value.

The method described in FIG. 4 outlines some of the operations related to jackpot management. In operation 402, a player bets a certain amount X and spins the wheels. A check is made to determine if the player has won the jackpot in operation 404. If the player did not win the jackpot, the method flows to operation 406 where a contribution amount Y, based on the amount bet X, is added to the jackpot of the player and to the jackpots of the player's friends. From operation 406, the method flows back to operation 402.

If the player wins the jackpot, the method flows from operation 404 to operation 408, where the player is credited with the amount of the jackpot. After operation 408, the method flows to operation 410 where a reward is given to the player's friends in order to "share the fortune" of the player that won the jackpot. In one embodiment, each friend gets a fixed reward amount (e.g., 25 dollars, although other amounts are also possible). In another embodiment, the friends get a small percentage of the jackpot, such as one percent, although other percentage values are also possible.

From operation 410, the method flows to operation 412 where the jackpots of the player that won the jackpot and the jackpots of the player's friends are reset to the initial value.

Figure 5A:
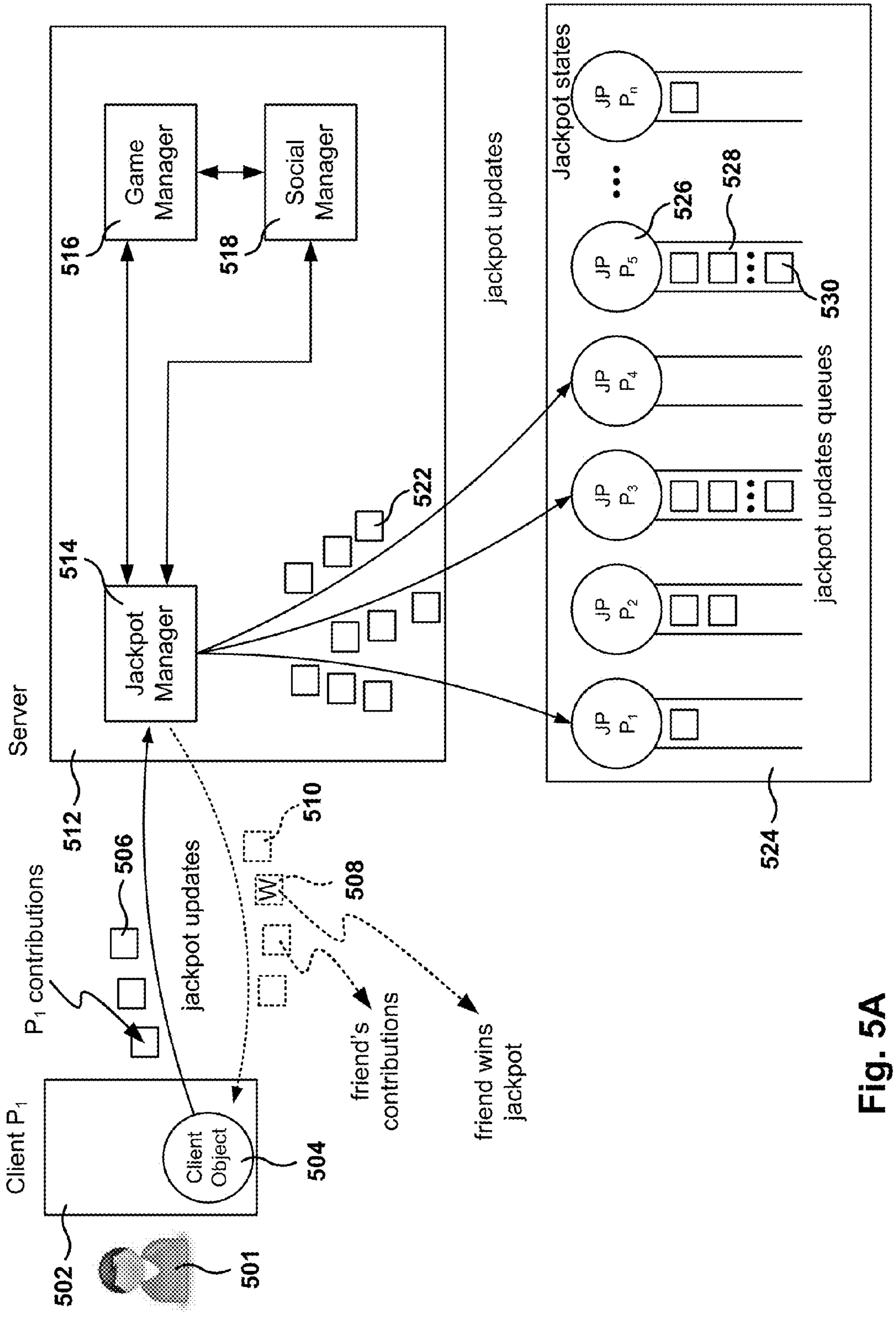
FIG. 5A illustrates the interaction between client and server regarding updates to the value of jackpots, according to one embodiment.

FIG. 5A illustrates the interaction between client and server regarding updates to the value of jackpots, according to one embodiment. In one embodiment, the online game is hosted by server 512, which includes a jackpot manager 514, a game manager 516, and a social manager 518. A player $P_1$ 501 plays the game utilizing client device 502 executing a computer program that includes a client state object 504 with jackpot related information. In one embodiment, the client 502 utilizes a web browser, and in another embodiment other computer programs may also be utilized to play the game, such as a computer program loaded on a computing device for the exclusive purpose of playing the game.

The client state object 504 tracks the amounts bet on one slot machine. In one embodiment, there is one client state object 504 per machine for the player. In one embodiment, the client state object 504 includes one or more of a current jackpot amount, a history of one or more most recent jackpot updates, jackpot contributions from the player's friends, timestamps for the jackpot contribution updates, history of times and duration of playing sessions, time of last synchronization with server, player identification, a cache of the list of player's friends, or any other game-related data.

Every time a bet is placed, a percentage of the bet is used as the added contribution for the jackpot state. Periodically (e.g., every five minutes, although other intervals are also possible), the jackpot state kept at the client is synchronized with the server 512. The client state object 504 sends information 506 regarding bets placed and current jackpot to the jackpot manager 514 in the server 512. The jackpot manager controls the state of the jackpots in each of the machines, and performs the synchronization required with the client state object of all players.

The jackpot manager 514 analyzes the received updates with game information 506 and determines the machine associated with the update, and what was the jackpot contribution. The jackpot manager 514 queries the social manager 518 for the social graph of user 501, where the social graph includes the identities of the friends of player 501 in the game. The social manager 518 manages the friendship relationships established in the game.

The jackpot manager 514 updates the jackpot information based on the received updates and notifies the game manager 516, so players have access to the current jackpot information. In one embodiment, the game manager 516 access shared data structures with the jackpot manager regarding the state of the jackpots for the players of the game. In one embodiment, the shared data structure includes jackpot states 524 for the game players.

In another embodiment, the jackpot states 526 for the players have an associated update queue 528 that holds the different jackpot updates for the respective player. Therefore, every time an update is received by the jackpot manager, after checking the social graph of the originating player, the jackpot manager places an update 522 in each of the friends of the jackpot contributor, as well as in the queue of the jackpot contributor. In one embodiment, the jackpot manager updates the jackpot state of the jackpot contributed immediately, without having to plays the update in the jackpot queue.

In one embodiment, the queued transactions include how much has been added to the jackpot, or that the jackpot has been won by a player. In one embodiment, a background process from the jackpot manager 514 processes the queues of the different players to update the jackpot values. In one embodiment, the queues of players that are not currently playing the game are not processed until a player starts playing the game. This way, processing time is saved by postponing the processing of updates until the update is needed when a player is in the game. In another embodiment, the background process perform some processing of the queues of players that are not playing the game when there are available resources to do so (e.g., a period of low gaming activity) or when the queues become large, exceeding a predetermined value of items in the queue.

It is noted that some of the jackpot updates 530 may be for a "jackpot win" transaction. In one embodiment, the jackpot manager adds the jackpot-win transaction to the end of the queues of the friends of the winner, and the transaction will be processed like any other jackpot-contribution transaction. In another embodiment, the jackpot manager determines that a win transaction has been received and clears the queues of all the friends of the winner, and then adds the win transaction to these queues. Since the win transaction resets the value of the jackpots, the jackpot manager does not have to process all the queued up transactions leading up to the jackpot-win transaction because the final outcome is always a jackpot reset.

When a player logs in, the jackpot manager 514 runs through the queue and tallies up the jackpot amount for the player that logged in. If a jackpot-win transaction is found, the jackpot manager 514 resets the jackpot back to the starting point for the jackpot. After the jackpot manager 514 tallies up all the transactions when a new player logs in, the jackpot manager 514 updates the jackpot amount for the player, and may indicate if a friend won the jackpot.

When player 501 is playing the game, the jackpot manager 514 sends updates to the client 502 regarding jackpot contributions 510 or regarding jackpot wins 508 from friends of player 501 that are currently playing the game at the same time. In one embodiment, if the friend wins the jackpot (i.e., a jackpot-win transaction 508 is received), the client object 504 resets the value of the jackpot for player 501.

It is noted that the embodiments illustrated in FIG. 5A are exemplary. Other embodiments may utilize different update mechanisms, different modules, or combine the functionality of one or more modules into a single module. The embodiments illustrated in FIG. 5A should therefore not be interpreted to be exclusive or limiting, but rather exemplary or illustrative.

FIG. 5B illustrates the format of the data structure, or message, used to inform the server of the jackpot update. This message is sent from the client in the player's computing device to the server, but in some embodiments the same message format may be used to send updates from the server to the client, or from the client to the clients of other players. In one embodiment, the message includes a transaction ID, a player ID, a timestamp, a name of the theme machine, amount bet, contribution to the jackpot, and the current jackpot value.

The transaction ID is a unique value associated with the message being sent, and may be used to detect duplicate messages. In another embodiment (not shown) the transaction ID of the previous message sent is also included in order to allow the server to detect missing transactions (e.g., missing jackpot updates). The player ID is a unique identifier in the online game of the player where the message originated. The timestamp includes the date and time when the message was sent to the server.

The machine field identifies the machine where a bet was made, and the contribution indicates how much was added to the jackpot. The jackpot value indicates the current value of the jackpot associated with the timestamp. The timestamp on the jackpot value may be utilized, in some embodiments, to synchronize the jackpot value between the client and the server.

FIG. 5C illustrates the format of the data structure, or message, used to inform the player's computing device of a jackpot update. This message is sent from the server to the player's computing device. In one embodiment, the message includes a transaction ID, a player ID, a timestamp, a name of the theme machine, amount bet, a contribution to the jackpot, the current jackpot value, and a message.

The fields in FIG. 5C have the same meaning as the fields In FIG. 5B, except that the amount bet represents the amount bet by one or more friends of the player, and the contribution represents the contribution to the jackpot by one or more friends of the player. In addition, an informational message may be included provide additional information to the player (e.g. "3 of your friends added $60 dollars to the jackpot"). This message may be presented to the player in an informational window within the GUI, or as a pop-up message.

It is appreciated that the embodiments illustrated in FIGS. 5B-5C are exemplary. Other embodiments may utilize different fields, present the fields in a different order, combine one or more fields into one, omit one or more fields, etc. The embodiments illustrated in FIGS. 5B-5C should therefore not be interpreted to be exclusive or limiting, but rather exemplary or illustrative.

Figure 6:
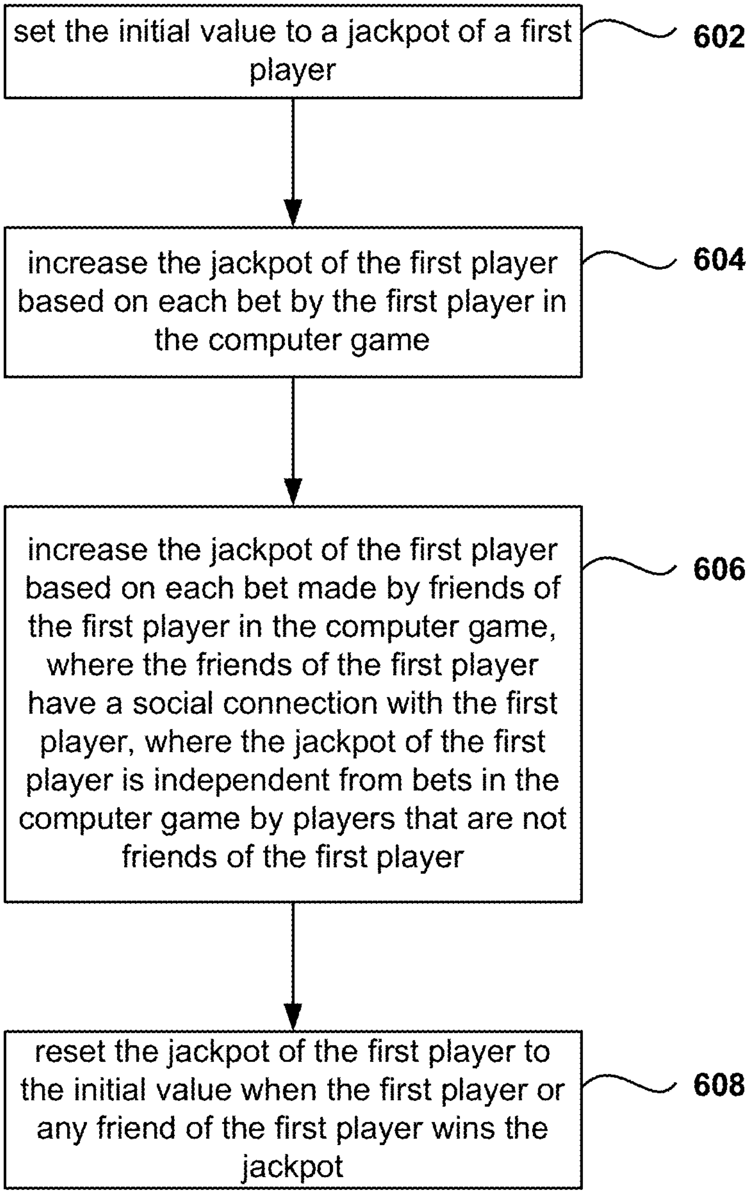
FIG. 6 shows a flowchart illustrating an algorithm for executing a computer game, in accordance with one embodiment.

FIG. 6 shows a flowchart illustrating an algorithm for executing a computer game, in accordance with one embodiment. In operation 602, the initial value of the jackpot of the first player is set. In one embodiment, the initial value is set to a fixed amount, and the different theme machines may include different initial values. In one embodiment, as the player progresses in the game, the player gains access to better theme machines with higher initial jackpots.

From operation 602 the method flows to operation 604, where the jackpot of the first player is increased based on bets by the first player in the computer game. In one embodiment, the increment is a fixed percentage of the amount bet by the first player (e.g., see equation (1) described above with reference to FIG. 2A).

From operation 604 the method flows to operation 606, where the jackpot of the first player is increased based on the bets made by friends of the first player in the computer game. In one embodiment, operation 604 and 606 are performed utilizing equation (2) described above with reference to FIG. 2A, but other equations based on the jackpot contributions for different players may also be utilized. The first player's friends have a social connection with the first player in the game, and the jackpot of the first player is independent from bets in the computer game by players that are not friends of the first player.

From operation 606 the method flows to operation 608 where the jackpot of the first player is reset to the initial value when the first player or when any friend of the first player wins the jackpot. In one embodiment, the method is executed by a processor.

Figure 7:
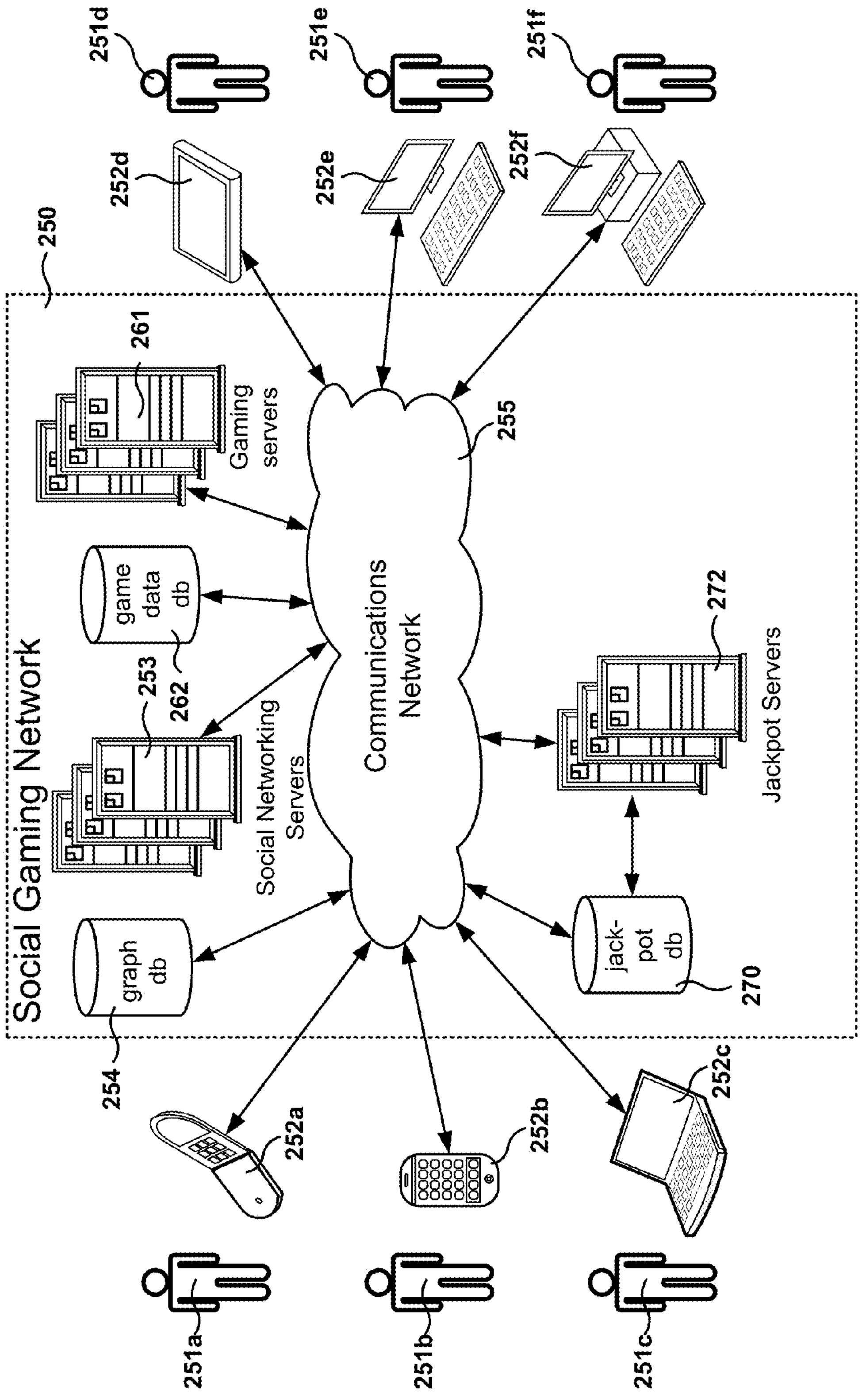
FIG. 7 shows a block diagram illustrating a social gaming network architecture, according to one embodiment.

FIG. 7 shows a block diagram illustrating a social gaming network architecture, according to one embodiment. In some implementations, a plurality of players (e.g., 251*a*-251*f*) may be utilizing a social gaming network 250. Each player interacts with the social gaming network via one or more client devices (e.g., client devices 252*a*-252*f*). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming databases 262 store data related to the gaming services, such as the gaming applications and modules, virtual gaming environment data, player gaming session data, player scores, player virtual gaming profiles, game stage levels, etc. The gaming servers may utilize the data from the gaming databases to perform the computations related to providing gaming services for the players.

Jackpot Servers 272 manage the jackpot system in the game, including the creation, tracking, expiration, abandonment, and deletion of jackpots. In addition, a jackpot database 270 holds jackpot state information, such as the jackpot states 524 of FIG. 5A.

Figure 8:
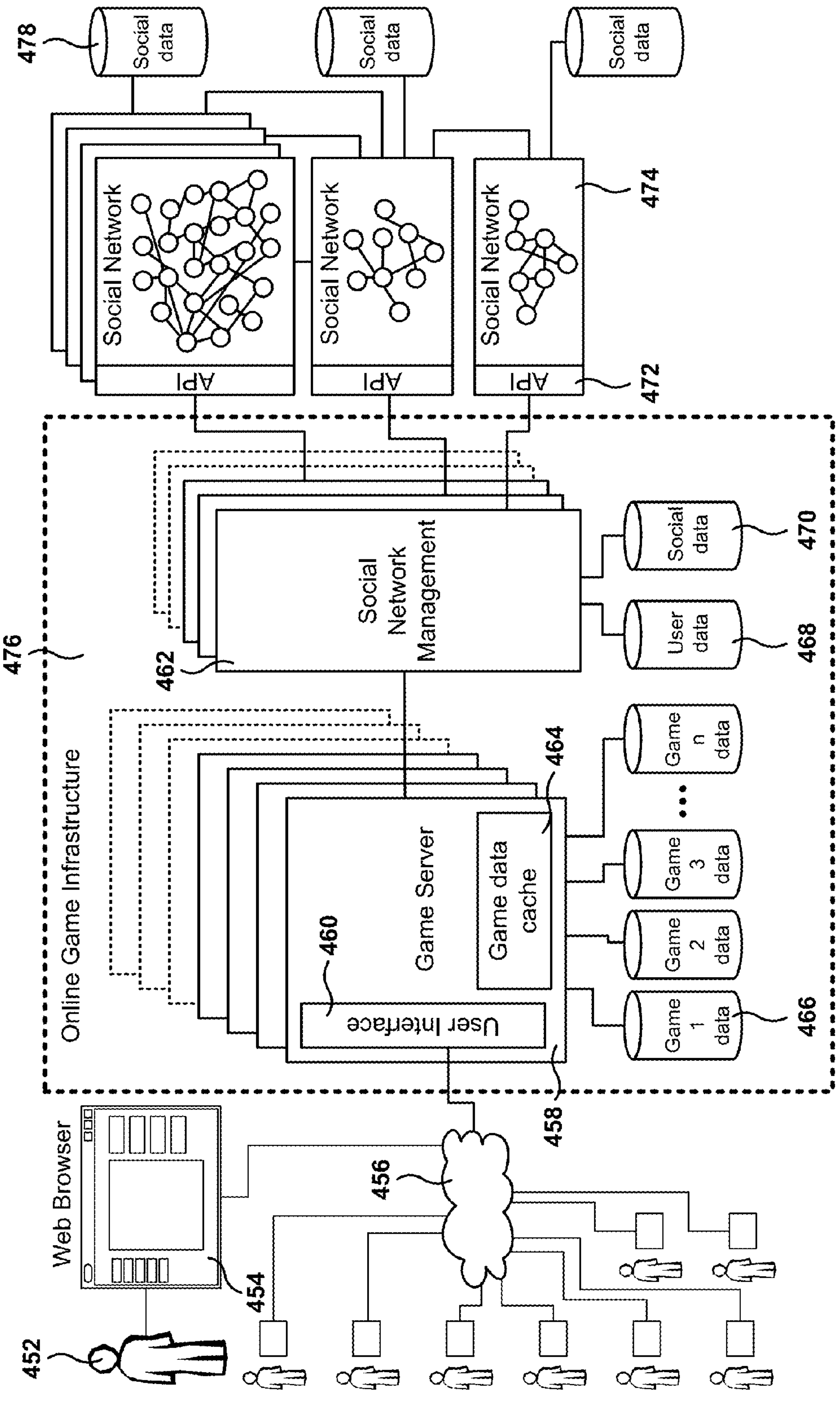
FIG. 8 illustrates an implementation of a Massively Multiplayer Online (MMO) infrastructure, according to one embodiment.

FIG. 8 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games.

Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 8 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

Figure 9:
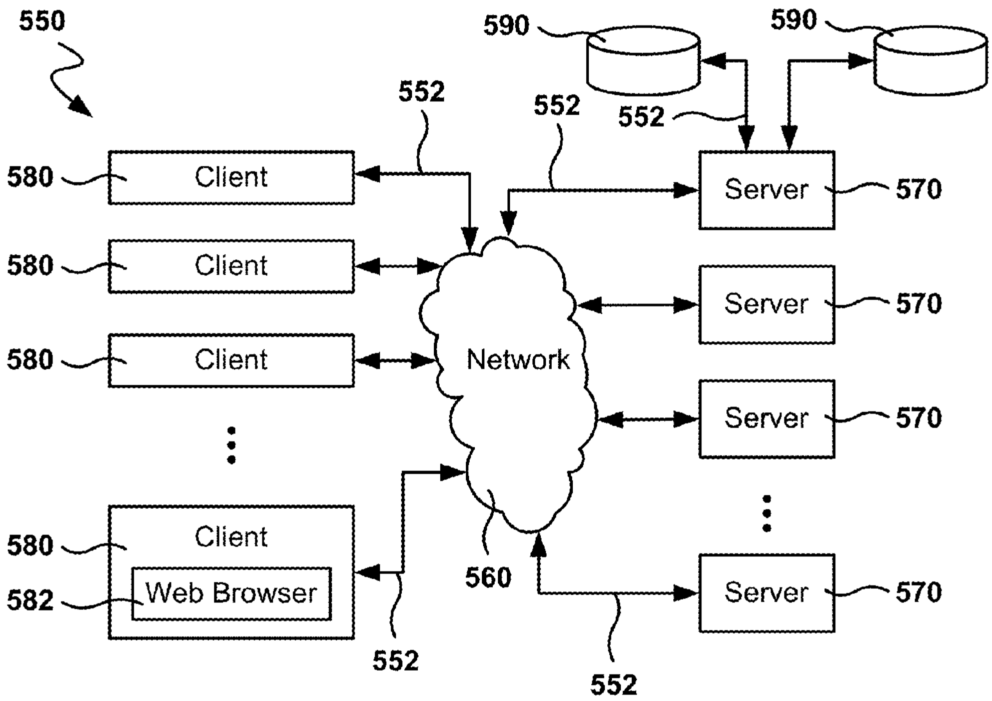
FIG. 9 illustrates an example network environment suitable for implementing embodiments.

FIG. 9 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, jackpot server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 10:
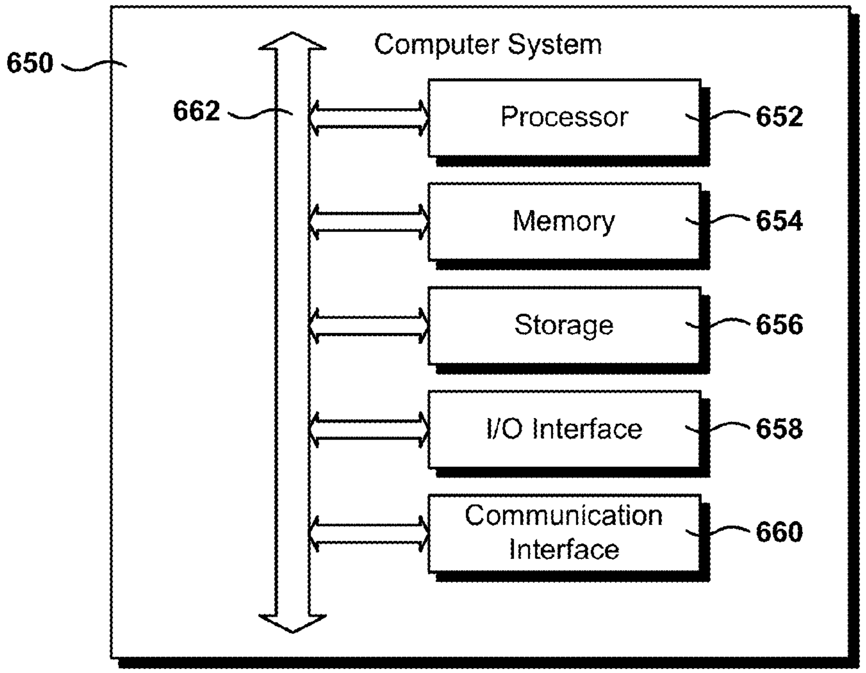
FIG. 10 illustrates an example computer system for implementing embodiments.

FIG. 10 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method implemented by a game server for executing an online game, the method comprising:

defining a plurality of jackpots for a plurality of respective players in the online game, wherein each player in the online game has a respective jackpot that is winnable only by said each player, wherein each jackpot has a jackpot value that is calculated separately from jackpot values of other players;

setting an initial value to the jackpot value of a first jackpot from the plurality of jackpots, the first jackpot being associated with a first player;

invoking an application programming interface (API) to access a social network server, the social network server returning information on who are friends of the first player in the social network;

determining friends of the first player in the online game by identifying which friends of the first player in the social network are players in the online game;

increasing the jackpot value of the first jackpot based on each bet by the first player in the online game;

increasing the jackpot value of the first jackpot based on each bet made by friends of the first player in the online game, wherein the jackpot value of the first jackpot is independent from bets in the online game by players that are not friends of the first player in the online game; and resetting the jackpot value of the first jackpot to the initial value when the first player wins the first jackpot or when any friend of the first player in the online game wins their respective jackpot, wherein operations of the method are executed by a processor.

2. The method as recited in claim 1, further including:

resetting jackpot values of jackpots of friends of the first player in the online game to the initial value when the first player wins the first jackpot.

3. The method as recited in claim 1, wherein increasing the jackpot value of the first jackpot of the first player based on each bet by the first player further includes:

determining a bet of the first player;

determining a contribution based on the bet;

adding the contribution to the first jackpot of the first player; and adding the contribution to the jackpots of the friends of the first player in the online game.

4. The method as recited in claim 3, wherein determining the contribution further includes:

making the contribution equal to a percentage of the bet of the first player.

5. The method as recited in claim 1, wherein increasing the jackpot value of the first jackpot of the first player based on each bet made by friends of the first player in the online game further includes:

determining a bet of a second player that is a friend of the first player in the online game;

determining a contribution based on the bet of the second player;

adding the contribution to a second jackpot of the second player in response to the bet of the second player;

adding the contribution to the first jackpot of the first player in response to the bet of the second player; and adding the contribution to jackpots of other friends of the second player in the online game besides the first player in response to the bet of the second player.

6. The method as recited in claim 1, further including:

leaving unchanged the first jackpot of the first player when a player that is not a friend of the first player in the online game wins the jackpot.

7. The method as recited in claim 1, wherein the online game is a slots casino game, wherein the slots casino game includes a plurality of machines for playing slots, wherein each machine has a different jackpot value for the first player.

8. The method as recited in claim 1, further including:

giving a consolation reward to friends of the first player in the online game when the first player wins the first jackpot.

9. The method as recited in claim 1, wherein the first jackpot is won when predetermined symbols line up in a slots game after spinning.

10. The method as recited in claim 9, wherein there is a predetermined probability to win the first jackpot each time the first player places the bet.

11. The method as recited in claim 1, wherein operations of the method are performed by a computer program when executed by one or more processors, the computer program being embedded in a non-transitory computer-readable storage medium.

12. A system for executing an online game, the system comprising:

a memory operable to store a jackpot state for each player of the online game, wherein each player in the online game has a respective jackpot state that is calculated separately from jackpot states of other players, wherein each jackpot is winnable only by one of said players in the online game;

a social manager configured to provide identities of friends of players in the online game, wherein the social manager is configured to access a social network server to obtain information about friends of a first player in the social network, the access including invoking an application programming interface (API) to access the social network server, wherein the social manager determines the friends of the first player in the online game by identifying which friends of the first player in the social network are players in the online game; and a jackpot manager including a processor, the jackpot manager configured to:

receive jackpot updates from players;

for each jackpot update from the first player, update the jackpot states of the first player and the jackpot states of friends of the first player in the online game; and when the first player wins the jackpot, reset the jackpot states of the first player and reset the jackpot states of the friends of the first player and leave while leaving unchanged the jackpot states of players that are not friends of the first player in the online game.

13. A computer program embedded in a non-transitory computer-readable storage medium, when executed by one or more processors of a game server, for executing an online game, the computer program comprising:

program instructions for defining a plurality of jackpots for a plurality of respective players in the online game, wherein each player in the online game has a respective jackpot that is winnable only by said each player, wherein each jackpot has a jackpot value that is calculated separately from jackpot values of other players;

program instructions for setting an initial value to the jackpot value of a first jackpot from the plurality of jackpots, the first jackpot being associated with a first player;

program instructions for invoking an application programming interface (API) to access a social network server, the social network server returning information on who are friends of the first player in the social network;

program instructions for determining friends of the first player in the online game by identifying which friends of the first player in the social network are players in the online game;

program instructions for increasing the jackpot value of the first jackpot based on each bet by the first player in the online game;

program instructions for increasing the jackpot value of the first jackpot based on each bet made by friends of the first player in the online game, wherein the jackpot value of the first jackpot is independent from bets in the online game by players that are not friends of the first player in the online game; and program instructions for resetting the jackpot value of the first jackpot to the initial value when the first player wins the first jackpot or when any friend of the first player in the online game wins their respective jackpot and for leaving the first jackpot unchanged when any player that is not a friend of the first player in the online game wins their respective jackpot.

14. The computer program as recited in claim 13, further including:

program instructions for resetting jackpot values of the jackpots of the friends of the first player in the online game to the initial value when the first player wins the first jackpot.

15. The computer program as recited in claim 13, wherein increasing the jackpot value of the first jackpot of the first player based on each bet by the first player further includes:

program instructions for determining a bet of the first player;

program instructions for determining a contribution based on the bet; and program instructions for adding the contribution to the first jackpot of the first player and to the jackpots of the friends of the first player in the online game.

16. The computer program as recited in claim 13, wherein increasing the jackpot value of the first jackpot of the first player based on each bet made by friends of the first player further includes:

program instructions for determining a bet of a second player that is a friend of the first player in the online game;

program instructions for determining a contribution based on the bet of the second player; and program instructions for adding the contribution to a second jackpot of the second player, to the first jackpot of the first player, and to jackpots of other friends of the second player in the online game besides the first player.

17. The computer program as recited in claim 13, further including:

program instructions for leaving unchanged the first jackpot of the first player when a player that is not a friend of the first player in the online game wins the respective jackpot.

18. The computer program as recited in claim 13, wherein the online game is a slots casino game, wherein the slots casino game includes a plurality of machines for playing slots, wherein each machine has a different jackpot value for the first player.

19. The computer program as recited in claim 13, further including:

program instructions for giving a consolation reward to friends of the first player in the online game when the first player wins the first jackpot.

* * * * *